(12) United States Patent
Lee

(10) Patent No.: US 11,060,564 B2
(45) Date of Patent: Jul. 13, 2021

(54) OFFSET COUPLING

(71) Applicant: Fu-Hsiung Lee, New Taipei (TW)

(72) Inventor: Fu-Hsiung Lee, New Taipei (TW)

( * ) Notice: Subject to any disclaimer, the term of this patent is extended or adjusted under 35 U.S.C. 154(b) by 247 days.

(21) Appl. No.: 16/503,864

(22) Filed: Jul. 5, 2019

(65) Prior Publication Data
US 2020/0292004 A1    Sep. 17, 2020

(30) Foreign Application Priority Data

Mar. 11, 2019   (TW) ................. 108108101

(51) Int. Cl.
*F16D 3/04*    (2006.01)
(52) U.S. Cl.
CPC ...................... *F16D 3/04* (2013.01)
(58) Field of Classification Search
CPC ..................... F16D 3/04; F16D 3/72
See application file for complete search history.

(56) References Cited

U.S. PATENT DOCUMENTS

| | | | | |
|---|---|---|---|---|
| 3,242,694 | A | * | 3/1966 | Schmidt |
| 3,791,170 | A | * | 2/1974 | Schmidt |
| 4,084,411 | A | * | 4/1978 | Mayfield |
| 5,700,197 | A | * | 12/1997 | Kuribayashi |
| 5,951,400 | A | * | 9/1999 | Giere |
| 6,213,883 | B1 | * | 4/2001 | Giere |

* cited by examiner

*Primary Examiner* — Francis C Gray
(74) *Attorney, Agent, or Firm* — Muncy, Geissler, Olds & Lowe, P.C.

(57) ABSTRACT

An offset coupling includes a first coupling disc, a second coupling disc, and a multi-link structure. The first coupling disc includes a first pivoting portion, a second pivoting portion, and a third pivoting portion surround a first central axis. The second coupling disc includes a fourth pivoting portion, a fifth pivoting portion, and a sixth pivoting portion surround a second central axis. The multi-link structure includes a first linkage group, a second linkage group, and a third linkage group, two first cranks of the first linkage group are respectively pivotally connected to the first pivoting portion and the fourth pivoting portion, two second cranks of the second linkage group are respectively pivotally connected to the second pivoting portion and the fifth pivoting portion, and two third cranks of the third linkage group are respectively pivotally connected to the third pivoting portion and the sixth pivoting portion.

10 Claims, 6 Drawing Sheets

OFFSET COUPLING

CROSS-REFERENCE TO RELATED APPLICATION

This non-provisional application claims priority under 35 U.S.C. § 119(a) to patent application Ser. No. 10/810,8101 in Taiwan, R.O.C. on Mar. 11, 2019, the entire contents of which are hereby incorporated by reference.

BACKGROUND

Technical Field

The instant disclosure relates to a coupling, and in particular, to an offset coupling.

Related Art

Couplings are very common power transmission components, are mainly used to connect rotating shafts of two mechanical devices (such as motors or screws), and can be disassembled at any time when replacement or repair is required. Couplings have a long history of development. In order to meet needs of various uses, various types of couplings or couplings with various performance have been developed on the market.

Taking the most common rigid couplings and flexible couplings as an example, the rigid couplings can allow the two connected rotating shafts to be fixed to form an integrity and accurately transmit torque, but the two connected rotating shafts are not allowed to produce eccentricity and declination. Therefore, requirements for concentricity in use are very high. Although the flexible couplings have a function of mitigating impact, absorbing parallelism, declination, and axial deviation, the flexible couplings can allow only a small amount of deviation.

SUMMARY

In view of the above, in an embodiment, an offset coupling is provided. The offset coupling includes a first coupling disc, a second coupling disc, and a multi-link structure. The first coupling disc includes a first central axis, a first pivoting portion, a second pivoting portion, and a third pivoting portion, and the first pivoting portion, the second pivoting portion, and the third pivoting portion surround the first central axis. The second coupling disc is disposed parallel to the first coupling disc, the second coupling disc includes a second central axis, a fourth pivoting portion, a fifth pivoting portion, and a sixth pivoting portion, the fourth pivoting portion, the fifth pivoting portion, and the sixth pivoting portion surround the second central axis, the first pivoting portion and the fourth pivoting portion are respectively located on two opposite sides of the first central axis, the second pivoting portion and the fifth pivoting portion are respectively located on two opposite sides of the first central axis, and the third pivoting portion and the sixth pivoting portion are respectively located on two opposite sides of the first central axis. The multi-link structure is located between the first coupling disc and the second coupling disc, the multi-link structure includes a first linkage group, a second linkage group, and a third linkage group, the first linkage group includes a first radial bar and two first cranks respectively pivotally connected to two ends of the first radial bar, the second linkage group includes a second radial bar and two second cranks respectively pivotally connected to two ends of the second radial bar, the third linkage group includes a third radial bar and two third cranks pivotally connected to two ends of the third radial bar, the first radial bar, the second radial bar, and the third radial bar are mutually coaxially pivotally provided to form a pivoting shaft, the two first cranks of the first linkage group are respectively pivotally connected to the first pivoting portion and the fourth pivoting portion, the two second cranks of the second linkage group are respectively pivotally connected to the second pivoting portion and the fifth pivoting portion, and the two third cranks of the third linkage group are respectively pivotally connected to the third pivoting portion and the sixth pivoting portion.

Thereby, in the offset coupling in the embodiments of the instant disclosure, the first coupling disc and the second coupling disc may be respectively connected to rotating shafts of two mechanical devices (such as motors or screws), and through design of the multi-link structure between the first coupling disc and the second coupling disc, the two rotating shafts of the mechanical device can allow a relatively large offset and can still keep synchronous operation in a deviation process.

DETAILED DESCRIPTION

Figure 1:
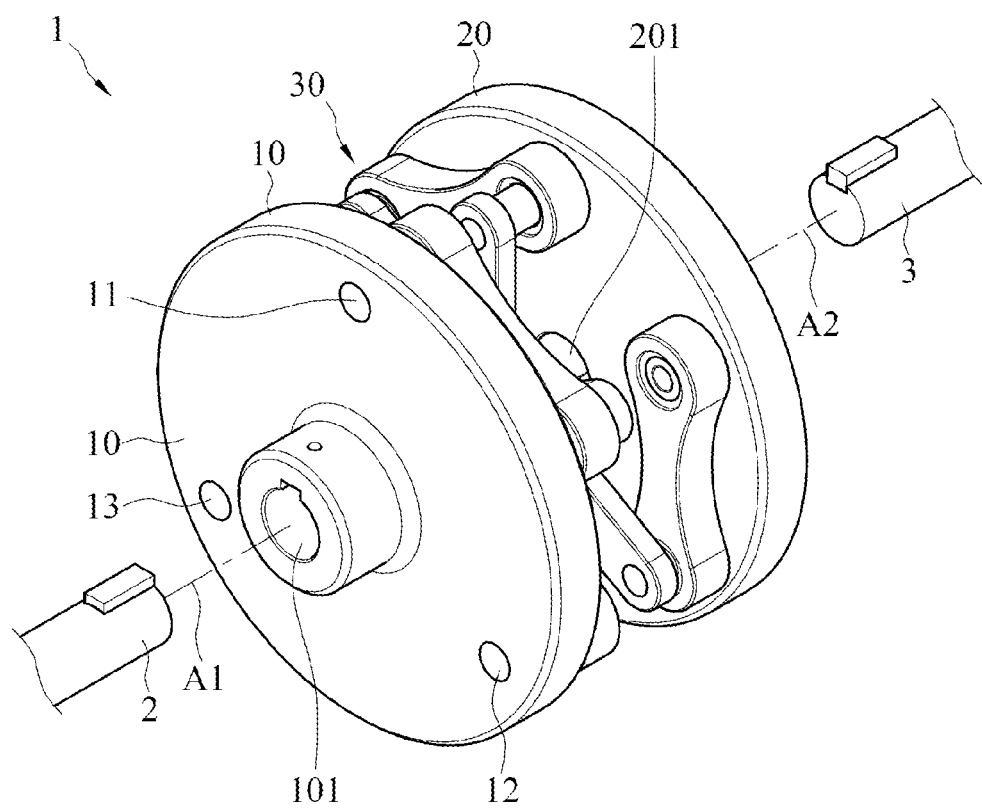
FIG. 1 is a three-dimensional diagram of an embodiment of an offset coupling according to the instant disclosure.
Figure 2:
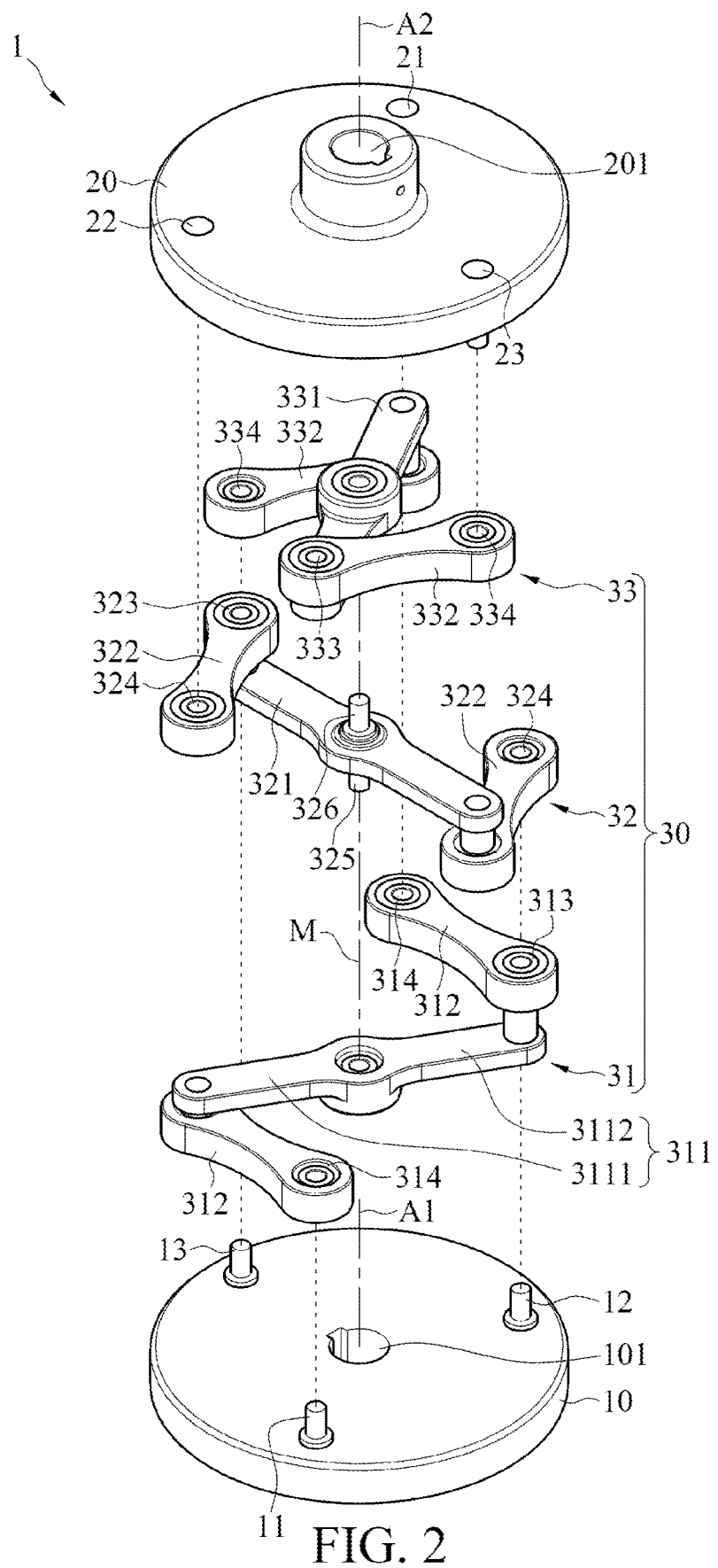
FIG. 2 is an exploded three-dimensional diagram of an embodiment of an offset coupling according to the instant disclosure.

FIG. 1 is a three-dimensional diagram of an embodiment of an offset coupling according to the instant disclosure; and FIG. 2 is an exploded three-dimensional diagram of an embodiment of an offset coupling according to the instant disclosure. As shown in FIG. 1, an offset coupling 1 in this embodiment includes a first coupling disc 10, a second coupling disc 20, and a multi-link structure 30. The multi-link structure 30 is connected between the first coupling disc 10 and the second coupling disc 20. The offset coupling 1 is a power transmission component and is used to connect rotating shafts of two mechanical devices (such as motors or screws), so that the two mechanical devices can perform transmission through the offset coupling 1 and can allow an offset of a certain degree.

As shown in FIG. 1 and FIG. 2, the first coupling disc 10 in this embodiment is a round disc body. The first coupling disc 10 includes a first central axis A1 and at least three pivoting portions (which are a first pivoting portion 11, a second pivoting portion 12, and a third pivoting portion 13 herein). The center of the first coupling disc 10 is provided with a shaft hole 101 for a rotating shaft 2 of a mechanical device to be assembled in, so that the first coupling disc 10 and the rotating shaft 2 can synchronously rotate. However, this is not limited in this embodiment. In other embodiments, the first coupling disc 10 may be alternatively a disc body of another shape (such as a square shape, an ellipse, a rectangle, or another irregular shape). Alternatively, in another embodiment, the first coupling disc 10 and the rotating shaft 2 of the mechanical device may have an integrated structure.

As shown in FIG. 1 and FIG. 2, the first pivoting portion 11, the second pivoting portion 12, and the third pivoting portion 13 of the first coupling disc 10 surround the first central axis A1. In this embodiment, the first pivoting portion 11, the second pivoting portion 12, and the third pivoting portion 13 are arranged along an outer periphery of the first coupling disc 10. In addition, the first pivoting portion 11, the second pivoting portion 12, and the third pivoting portion 13 in this embodiment are arranged and configured at equal angles (which are 120° herein) by using the first central axis A1 as a basis but are not limited thereto. In some embodiments, the first pivoting portion 11, the second pivoting portion 12, and the third pivoting portion 13 may be shaft bars or shaft holes for other components to be pivotally connected to. For example, as shown in FIG. 2, the first pivoting portion 11, the second pivoting portion 12, and the third pivoting portion 13 in this embodiment are shaft bars provided on the surface of the first coupling disc 10 in a raised manner, and axial directions of the shaft bars are parallel to the first central axis A1.

As shown in FIG. 1 and FIG. 2, the second coupling disc 20 in this embodiment is also a round disc body. The size of the second coupling disc 20 may be the same as or different from that of the first coupling disc 10. The second coupling disc 20 includes a second central axis A2 and at least three pivoting portions (which are a fourth pivoting portion 21, a fifth pivoting portion 22, and a sixth pivoting portion 23 herein). The second coupling disc 20 is disposed parallel to the first coupling disc 10. That is, the first coupling disc 10 and the second coupling disc 20 are mutually spaced and do not contact each other, and the first central axis A1 of the first coupling disc 10 and the second central axis A2 of the second coupling disc 20 are parallel to or overlap with each other. In this embodiment, the center of the second coupling disc 20 is provided with a shaft hole 201 for a rotating shaft 3 of another mechanical device to be assembled in, so that the second coupling disc 20 and the rotating shaft 3 can synchronously rotate. However, this is not limited in this embodiment. In other embodiments, the second coupling disc 20 may be alternatively a disc body of another shape (such as a square shape, an ellipse, a rectangle, or another irregular shape). Alternatively, in another embodiment, the second coupling disc 20 and the rotating shaft 3 of the mechanical device may have an integrated structure.

As shown in FIG. 1 and FIG. 2, the fourth pivoting portion 21, the fifth pivoting portion 22, and the sixth pivoting portion 23 of the second coupling disc 20 surround the second central axis A2. In this embodiment, the fourth pivoting portion 21, the fifth pivoting portion 22, and the sixth pivoting portion 23 are arranged along an outer periphery of the second coupling disc 20. In addition, the fourth pivoting portion 21, the fifth pivoting portion 22, and the sixth pivoting portion 23 in this embodiment are arranged and configured at equal angles (which are 120° herein) by using the second central axis A2 as a basis but are not limited thereto. In some embodiments, the fourth pivoting portion 21, the fifth pivoting portion 22, and the sixth pivoting portion 23 may be shaft bars or shaft holes for other components to be pivotally connected to. For example, as shown in FIG. 2, the fourth pivoting portion 21, the fifth pivoting portion 22, and the sixth pivoting portion 23 in this embodiment are shaft bars provided on the surface of the second coupling disc 20 in a raised manner, and axial directions of the shaft bars are parallel to the second central axis A2.

As shown in FIG. 2, the first pivoting portion 11 of the first coupling disc 10 and the fourth pivoting portion 21 of the second coupling disc 20 are respectively located on two opposite sides of the first central axis A1 and the second central axis A2, the second pivoting portion 12 of the first coupling disc 10 and the fifth pivoting portion 22 of the second coupling disc 20 are respectively located on two opposite sides of the first central axis A1 and the second central axis A2, and the third pivoting portion 13 of the first coupling disc 10 and the sixth pivoting portion 23 of the second coupling disc 20 are respectively located on two opposite sides of the first central axis A1 and the second central axis A2.

Figure 3:
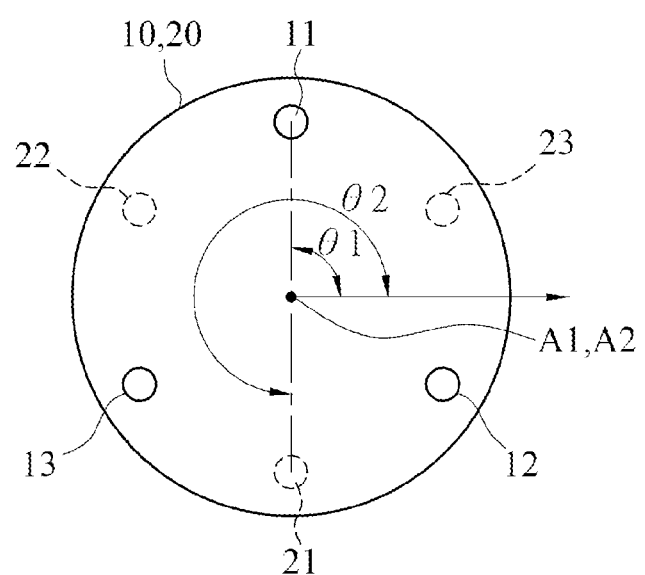
FIG. 3 is a configuration schematic diagram of an embodiment of an offset coupling according to the instant disclosure.

For example, as shown in FIG. 3, when the first central axis A1 of the first coupling disc 10 and the second central axis A2 of the second coupling disc 20 overlap with each other, the first pivoting portion 11 has a first phase angle $\theta 1$ relative to the first central axis A1 and the second central axis A2, the fourth pivoting portion 21 has a second phase angle $\theta 2$ relative to the first central axis A1 and the second central axis A2, and a difference between the first phase angle $\theta 1$ and the second phase angle $\theta 2$ is 180°. That is, the second phase angle $\theta 2 = \pi +$ the first phase angle $\theta 1$, so that when centers of the first pivoting portion 11, the fourth pivoting portion 21, and the first coupling disc 10 are projected to the same plane, the first pivoting portion 11, the fourth pivoting portion 21, and the first coupling disc 10 are located on the same straight line, so that the first pivoting portion 11 of the first coupling disc 10 and the fourth pivoting portion 21 of the second coupling disc 20 are respectively located on two opposite sides of the first central axis A1 and the second central axis A2. A difference between a phase angle of the second pivoting portion 12 and a phase angle of the fifth pivoting portion 22 relative to the first central axis A1 and the second central axis A2 may also be 180°, and a difference between a phase angle of the third pivoting portion 13 and a phase angle of the sixth pivoting portion 23 relative to the first central axis A1 and the second central axis A2 may also be 180°. Details are not described herein. However, the foregoing difference between the first phase angle $\theta 1$ and the second phase angle $\theta 2$ is merely an example. Actually, the difference between the first phase angle $\theta 1$ and the second phase angle $\theta 2$ may be different due to a manufacturing tolerance of the offset coupling 1 or other requirements.

In some embodiments, the number of pivoting portions of the first coupling disc 10 corresponds to the number of pivoting portions of the second coupling disc 20. For example, in this embodiment, the number of pivoting portions of the first coupling disc 10 is 3 (the first pivoting portion 11, the second pivoting portion 12, and the third pivoting portion 13), and the number of pivoting portions of the second coupling disc 20 is correspondingly 3 (the fourth pivoting portion 21, the fifth pivoting portion 22, and the sixth pivoting portion 23). However, this is not limited.

Figure 5:
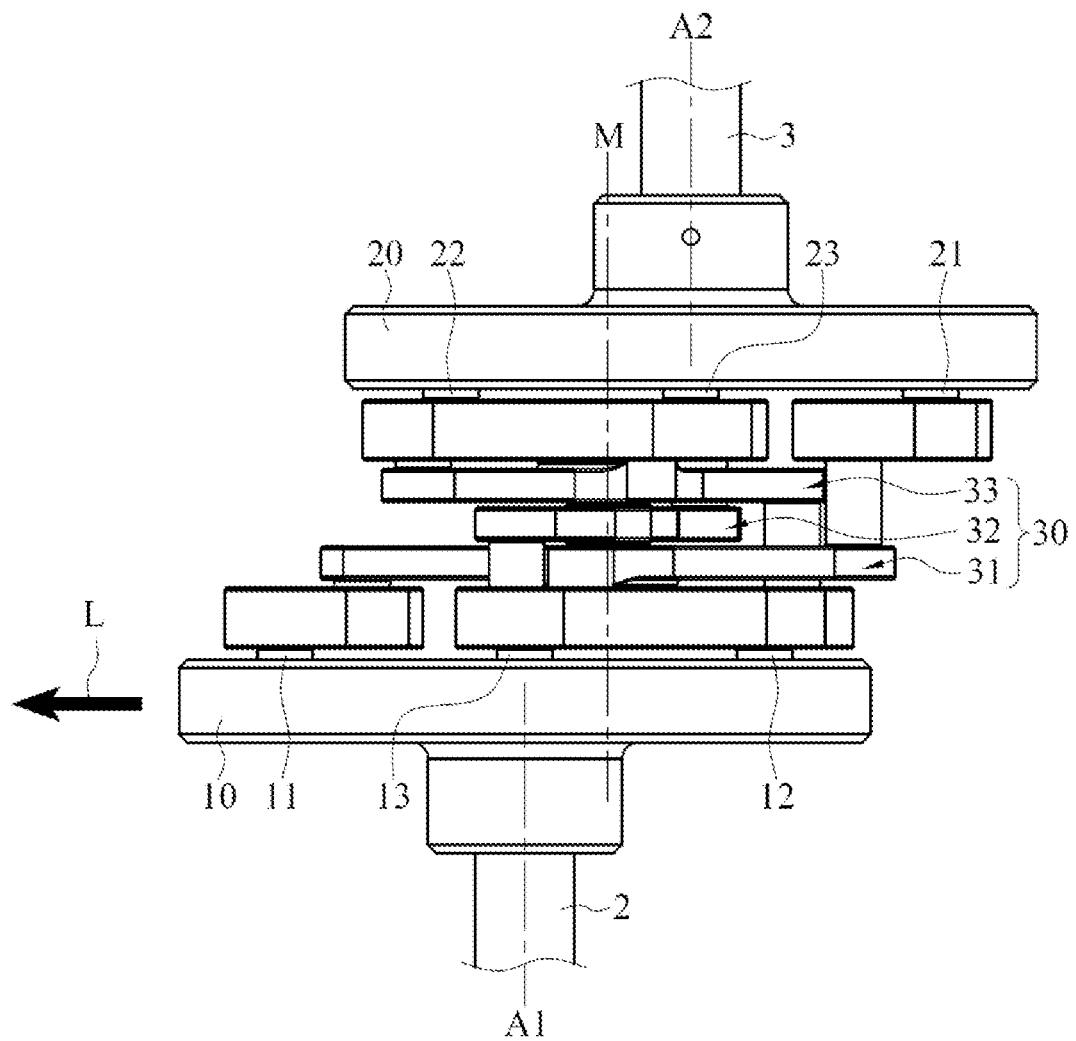
FIG. 5 is an offset schematic diagram of FIG. 4.

As shown in FIG. 1 and FIG. 2, the multi-link structure 30 is located between the first coupling disc 10 and the second coupling disc 20, and the multi-link structure 30 includes at least three linkage groups (which are a first linkage group 31, a second linkage group 32, and a third linkage group 33 herein), to correspond to the number of pivoting portions of the first coupling disc 10 and the number of pivoting portions of the second coupling disc 20. The first linkage group 31, the second linkage group 32, and the third linkage group 33 are separately Z-shaped linkage members. The first linkage group 31 includes a first radial bar 311 and two first cranks 312 respectively pivotally connected to two ends of the first radial bar 311. The second linkage group 32 includes a second radial bar 321 and two second cranks 322 respectively pivotally connected to two ends of the second radial bar 321. The third linkage group 33 includes a third radial bar 331 and two third cranks 332 respectively pivotally connected to two ends of the third radial bar 331. The first radial bar 311, the second radial bar 321, and the third radial bar 331 all extend toward radial directions of the first coupling disc 10 and the second coupling disc 20, and the first radial bar 311, the second radial bar 321, and the third radial bar 331 are mutually coaxially pivotally provided to form a pivoting shaft M (as shown in FIG. 5), and the pivoting shaft M is parallel to the first central axis A1 of the first coupling disc 10 and the second central axis A2 of the second coupling disc 20, so that the first radial bar 311, the second radial bar 321, and the third radial bar 331 can all rotate relative to each other separately by using the pivoting shaft M as a rotating shaft.

In some embodiments, as shown in FIG. 2, the second radial bar 321 may be axially provided with two shaft bars 325 and 326 in a raised manner, and the first radial bar 311 and the third radial bar 331 are respectively pivotally provided at the two shaft bars 325 and 326. However, this is not limited. In other embodiments, the first radial bar 311, the second radial bar 321, and the third radial bar 331 may be all provided with shaft holes and penetrate the shaft holes through pivots to achieve a pivoting effect.

As shown in FIG. 2, the two first cranks 312 of the first linkage group 31 are respectively pivotally connected to the first pivoting portion 11 and the fourth pivoting portion 21. In this embodiment, two ends of one first crank 312 are respectively pivotally connected to the first radial bar 311 and the first pivoting portion 11 of the first coupling disc 10, and two ends of the other first crank 312 are respectively pivotally connected to the first radial bar 311 and the fourth pivoting portion 21 of the second coupling disc 20, so that the first cranks 312 can swivel relative to the first coupling disc 10, the second coupling disc 20, and the first radial bar 311. The two second cranks 322 of the second linkage group 32 are respectively pivotally connected to the second pivoting portion 12 and the fifth pivoting portion 22. In this embodiment, two ends of one second crank 322 are respectively pivotally connected to the second radial bar 321 and the second pivoting portion 12 of the first coupling disc 10, and two ends of the other second crank 322 are respectively pivotally connected to the second radial bar 321 and the fifth pivoting portion 22 of the second coupling disc 20, so that the second cranks 322 can swivel relative to the first coupling disc 10, the second coupling disc 20, and the second radial bar 321. The two third cranks 332 of the third linkage group 33 are respectively pivotally connected to the third pivoting portion 13 and the sixth pivoting portion 23. In this embodiment, two ends of one third crank 332 are respectively pivotally connected to the third radial bar 331 and the third pivoting portion 13 of the first coupling disc 10, and two ends of the other third crank 332 are respectively pivotally connected to the third radial bar 331 and the sixth pivoting portion 23 of the second coupling disc 20, so that the third cranks 332 can swivel relative to the first coupling disc 10, the second coupling disc 20, and the third radial bar 331.

In some embodiments, design of lengths of the first radial bar 311 of the first linkage group 31 and the first cranks 312 may depend on the positions of the first pivoting portion 11 and the fourth pivoting portion 21, design of the lengths of the second radial bar 321 of the second linkage group 32 and the second cranks 322 may depend on the positions of the second pivoting portion 12 and the fifth pivoting portion 22, and design of the lengths of the third radial bar 331 of the third linkage group 33 and the third cranks 332 may depend on the positions of the third pivoting portion 13 and the sixth pivoting portion 23. As shown in FIG. 2 and FIG. 3, using the first linkage group 31 as an example, a distance between the first pivoting portion 11 and the first central axis A1 and a distance between the fourth pivoting portion 21 and the second central axis A2 are in a distance ratio (such as 1:1, 1:2, or 2:1). A length ratio of the first crank 312 of the first linkage group 31 pivotally connected to the first pivoting portion 11 to the first crank 312 pivotally connected to the fourth pivoting portion 21 is equal to the foregoing distance ratio. The first radial bar 311 of the first linkage group 31 is further divided by the pivoting shaft M into a first bar segment 3111 and a second bar segment 3112 (as shown in FIG. 2), the first bar segment 3111 is more adjacent to the first pivoting portion 11 than the second bar segment 3112, and a length ratio of the first bar segment 3111 to the second bar segment 3112 is also equal to the foregoing distance ratio.

Further, for example, as shown in FIG. 2 and FIG. 3, in this embodiment, the distance between the first pivoting portion 11 and the first central axis A1 is equal to the distance between the fourth pivoting portion 21 and the second central axis A2 (that is, the distance ratio is 1:1). Therefore, a length ratio of the two first cranks 312 of the first linkage group 31 is 1:1 (that is, the lengths of the two first cranks 312 are the same), and a length ratio of the first bar segment 3111 to the second bar segment 3112 of the first radial bar 311 is also 1:1 (that is, the length of the first bar segment 3111 is the same as that of the second bar segment 3112). The rest can be deduced by analogy. Assuming that the distance ratio of the distance between the first pivoting portion 11 and the first central axis A1 to the distance between the fourth pivoting portion 21 and the second central axis A2 is 1:2, the length ratio of the first crank 312 pivotally connected to the first pivoting portion 11 to the first crank 312 pivotally connected to the fourth pivoting portion 21 is 1:2, and the length ratio of the first bar segment 3111 to the second bar segment 3112 of the first radial bar 311 is also 1:2.

In some embodiments, the distance between the first pivoting portion 11 and the first central axis A1 and the distance between the fourth pivoting portion 21 and the second central axis A2 are in a first distance ratio, the distance between the second pivoting portion 12 and the first central axis A1 and the distance between the fifth pivoting portion 22 and the second central axis A2 are in a second distance ratio, and the distance between the third pivoting portion 13 and the first central axis A1 and the distance between the sixth pivoting portion 23 and the second central axis A2 are in a third distance ratio. The first distance ratio, the second distance ratio, and the third distance ratio are the same. For example, as shown in FIG. 3, in this embodiment, the distance between the first pivoting portion 11 and the first central axis A1 is equal to the distance between the fourth pivoting portion 21 and the second central axis A2 (that is, the first distance ratio is 1:1), the distance between the second pivoting portion 12 and the first central axis A1 is equal to the distance between the fifth pivoting portion 22 and the second central axis A2 (that is, the second distance ratio is 1:1), and the distance between the third pivoting portion 13 and the first central axis A1 is equal to the distance between the sixth pivoting portion 23 and the second central axis A2 (that is, the third distance ratio is 1:1). However, this is not limited. In other embodiments, the first distance ratio, the second distance ratio, and the third distance ratio may also be 1:2, 2:1, 1:3, 3:1, or the like.

Figure 4:
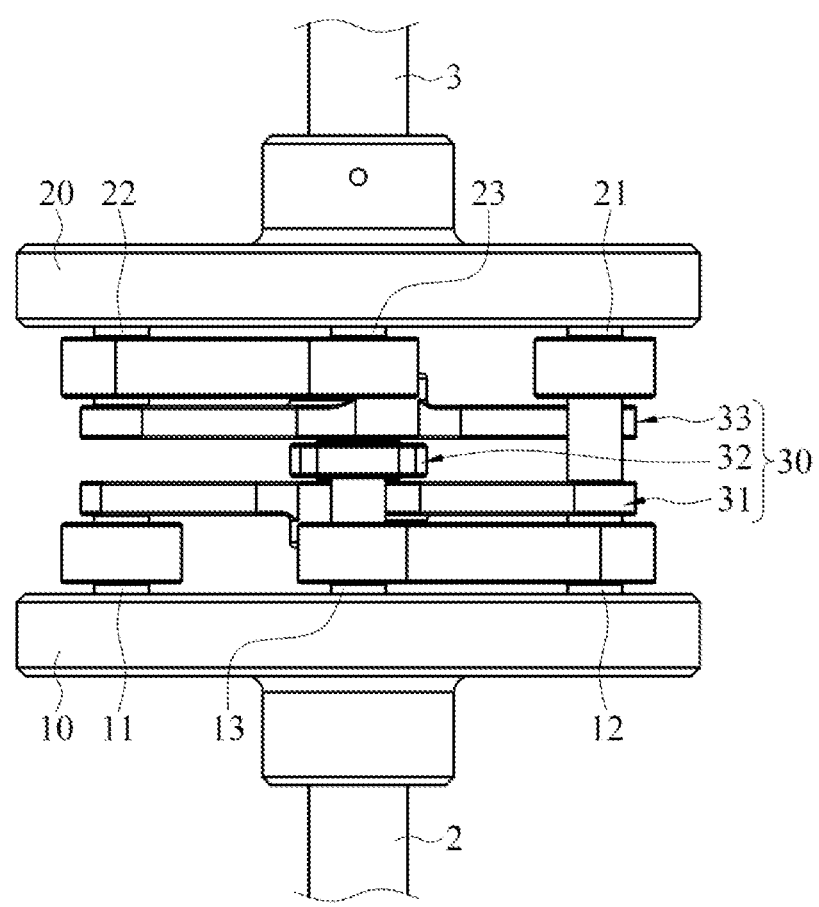
FIG. 4 is a top view of an embodiment of an offset coupling according to the instant disclosure.
Figure 6:
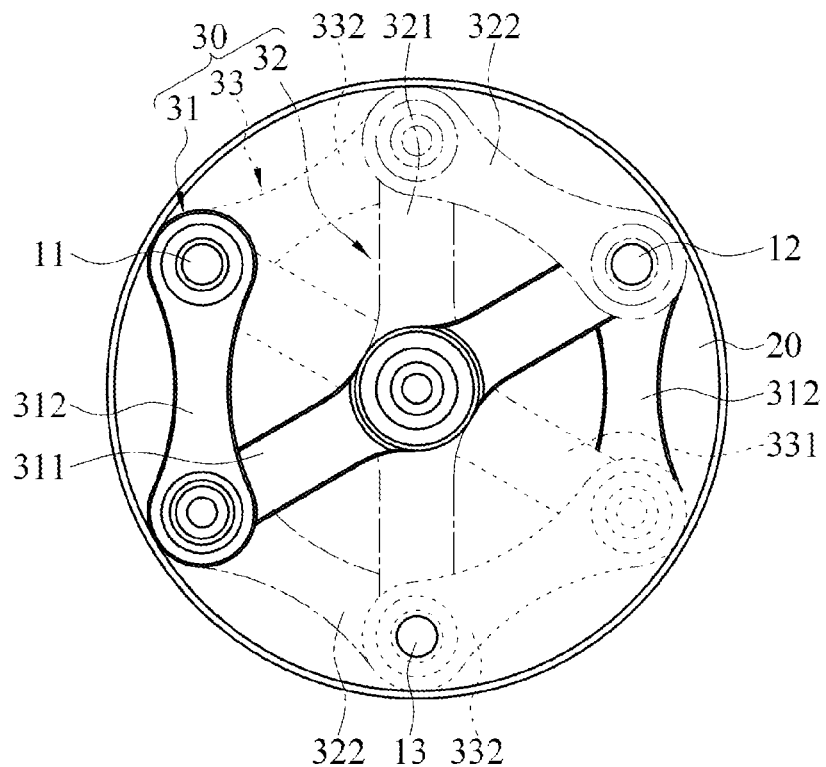
FIG. 6 is a side view of an embodiment of an offset coupling according to the instant disclosure.

Therefore, as shown in FIG. 4 and FIG. 6, when a coupling disc (such as the first coupling disc 10) is driven by the rotating shaft 2 to rotate, because linkage groups (the first linkage group 31, the second linkage group 32, and the third linkage group 33) of the multi-link structure 30 are respectively connected between the first coupling disc 10 and the second coupling disc 20. Therefore, the first coupling disc 10 may drive, via the multi-link structure 30, the second coupling disc 20 and the rotating shaft 3 to synchronously rotate to achieve a power transmission effect.

Figure 7:
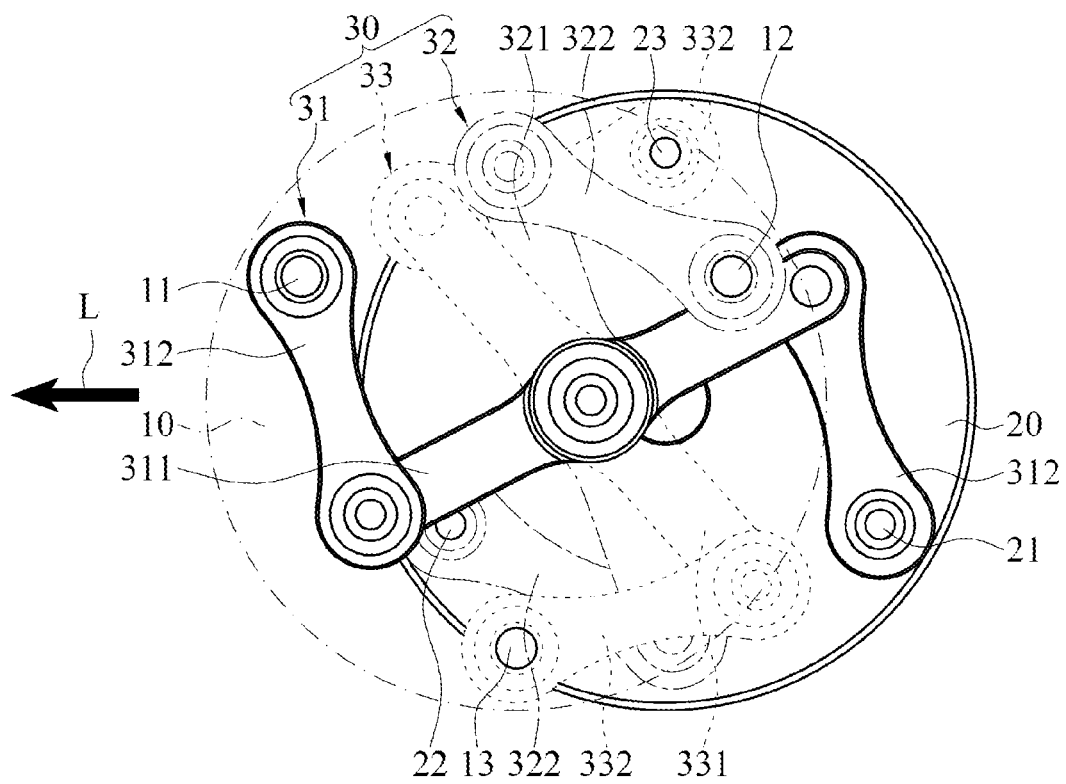
FIG. 7 is an offset schematic diagram of FIG. 6.

As shown in FIG. 5 and FIG. 7, when the first coupling disc 10 deviates from the second coupling disc 20, for example, when the first coupling disc 10 and the second coupling disc 20 are collided or vibration in a working environment is produced, causing deviation, because the first radial bar 311, the second radial bar 321, and the third radial bar 331 can freely rotate relative to each other, and the first cranks 312, the second cranks 322, and the third cranks 332 can also freely swivel, so that directions to which the first coupling disc 10 and the second coupling disc 20 deviate are not limited. In addition, compared with a conventional coupling, the first coupling disc 10 and the second coupling disc 20 in this embodiment of the instant disclosure can allow a relative large offset and can still keep synchronous and constant speed operation in a deviation process. Then, transmission in a mechanism configuration manner of a plurality of linkage groups (the first linkage group 31, the second linkage group 32, and the third linkage group 33) can disperse forces applied to the linkage groups to prolong a service life. This is further described as follows with reference to the accompanying drawings.

Referring to FIG. 4 and FIG. 5, when the first coupling disc 10 deviates from the second coupling disc 20, for example, the first coupling disc 10 deviates toward a direction of an arrow L, the pivoting shaft M formed by mutually coaxially pivotally providing the first radial bar 311, the second radial bar 321, and the third radial bar 331 may synchronously deviate along with the first central axis A1 of the first coupling disc 10 and the second central axis A2 of the second coupling disc 20. That is, the pivoting shaft M in this embodiment may deviate toward the direction of the arrow L. Referring to FIG. 6 and FIG. 7, in a deviation process of the first coupling disc 10 and the second coupling disc 20, the first radial bar 311, the second radial bar 321, and the third radial bar 331 may rotate relative to each other, and swiveling angles of two cranks of the linkage groups are the same. For example, as shown in FIG. 6 and FIG. 7, to clearly describe actuation situations of the first linkage group 31, the second linkage group 32, and the third linkage group 33, the first linkage group 31, the second linkage group 32, and the third linkage group 33 are respectively represented by different line types herein. For example, the first linkage group 31 is represented by a solid line, the second linkage group 32 is represented by a dot-chain line, and the third linkage group 33 is represented by a dashed line. From a viewing direction of FIG. 6 and FIG. 7, in a deviation process of the first coupling disc 10 and the second coupling disc 20 (for example, the first coupling disc 10 deviates toward the direction of the arrow L), the first radial bar 311 of the first linkage group 31 may rotate slightly clockwise, and the two first cranks 312 swivel toward the same direction by the same angle. The second radial bar 321 of the second linkage group 32 rotates counterclockwise, and the two second cranks 322 also swivel toward the same direction by the same angle. The third radial bar 331 of the third linkage group 33 rotates clockwise, and the two third cranks 332 swivel toward the same direction by the same angle. Therefore, actuation manners of the first linkage group 31, the second linkage group 32, and the third linkage group 33 enable deviation directions of the first coupling disc 10 and the second coupling disc 20 not to be limited, allow a relatively large offset, and keep synchronous and constant speed operation in a deviation process.

As shown in FIG. 2, in an embodiment, two ends of each of the first cranks 312 of the first linkage group 311 are respectively provided with bearings 313 and 314, two ends of each of the second cranks 322 of the second linkage group 32 are respectively provided with bearings 323 and 324, and two ends of each of the third cranks 332 of the third linkage group 33 are also provided with bearings 333 and 334. The first radial bar 311, the first pivoting portion 11 of the first coupling disc 10, and the fourth pivoting portion 21 of the second coupling disc 20 are respectively pivotally connected to the bearings 313 and 314. The second radial bar 321, the second pivoting portion 12 of the first coupling disc 10, and the fifth pivoting portion 22 of the second coupling disc 20 are respectively pivotally connected to the bearings 323 and 324. The third radial bar 331, the third pivoting portion 13 of the first coupling disc 10, and the sixth pivoting portion 23 of the second coupling disc 20 are respectively pivotally connected to the bearings 333 and 334. Therefore, when the first coupling disc 10 deviates from the second coupling disc 20, friction produced by operation of the multi-link structure 30 can be greatly reduced, thereby prolonging a service life.

Although the instant disclosure has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An offset coupling, comprising:
   a first coupling disc, comprising a first central axis, a first pivoting portion, a second pivoting portion, and a third pivoting portion, wherein the first pivoting portion, the second pivoting portion, and the third pivoting portion surround the first central axis;
   a second coupling disc, disposed parallel to the first coupling disc, wherein the second coupling disc comprises a second central axis, a fourth pivoting portion, a fifth pivoting portion, and a sixth pivoting portion, the fourth pivoting portion, the fifth pivoting portion, and the sixth pivoting portion surround the second central axis, the first pivoting portion and the fourth pivoting portion are respectively located on two opposite sides of the first central axis, the second pivoting portion and the fifth pivoting portion are respectively located on two opposite sides of the first central axis, and the third pivoting portion and the sixth pivoting portion are respectively located on two opposite sides of the first central axis; and
   a multi-link structure, located between the first coupling disc and the second coupling disc, wherein the multi-link structure comprises a first linkage group, a second linkage group, and a third linkage group, the first linkage group comprises a first radial bar and two first cranks respectively pivotally connected to two ends of the first radial bar, the second linkage group comprises a second radial bar and two second cranks respectively pivotally connected to two ends of the second radial bar, the third linkage group comprises a third radial bar and two third cranks respectively pivotally connected to two ends of the third radial bar, the first radial bar, the second radial bar, and the third radial bar are mutually coaxially pivotally provided to form a pivoting shaft, the two first cranks of the first linkage group are respectively pivotally connected to the first pivoting portion and the fourth pivoting portion, the two second cranks of the second linkage group are respectively pivotally connected to the second pivoting portion and the fifth pivoting portion, and the two third cranks of the third linkage group are respectively pivotally connected to the third pivoting portion and the sixth pivoting portion.

2. The offset coupling according to claim 1, wherein the first pivoting portion, the second pivoting portion, and the third pivoting portion are arranged along an outer periphery of the first coupling disc.

3. The offset coupling according to claim 1, wherein the first pivoting portion, the second pivoting portion, and the third pivoting portion are configured with an angle of the first central axis.

4. The offset coupling according to claim 1, wherein a distance between the first pivoting portion and the first central axis and a distance between the fourth pivoting portion and the second central axis are in a first distance ratio, a distance between the second pivoting portion and the first central axis and a distance between the fifth pivoting portion and the second central axis are in a second distance ratio, and the first distance ratio is equal to the second distance ratio.

5. The offset coupling according to claim 1, wherein a distance between the first pivoting portion and the first central axis and a distance between the fourth pivoting portion and the second central axis are in a distance ratio, a first length ratio of the first crank pivotally connected to the first pivoting portion to the first crank pivotally connected to the fourth pivoting portion is equal to the distance ratio, the first radial bar is divided by the pivoting shaft into a first bar segment and a second bar segment, the first bar segment is more adjacent to the first pivoting portion than the second bar segment, and a second length ratio of the first bar segment to the second bar segment is equal to the distance ratio.

6. The offset coupling according to claim 5, wherein the distance between the first pivoting portion and the first central axis is equal to the distance between the fourth pivoting portion and the second central axis, the two first cranks of the first linkage group have the same lengths, and the length of the first bar segment of the first radial bar is the same as the length of the second bar segment.

7. The offset coupling according to claim 1, wherein the first pivoting portion has a first phase angle relative to the first central axis, the fourth pivoting portion has a second phase angle relative to the second central axis, and a difference between the first phase angle and the second phase angle is 180°.

8. The offset coupling according to claim 1, wherein the second radial bar is axially provided with two shaft bars in a raised manner, and the first radial bar and the third radial bar are respectively pivotally provided at the two shaft bars.

9. The offset coupling according to claim 1, wherein one end of each of the first cranks is provided with a bearing, and two ends of the first radial bar are respectively pivotally connected to the bearings.

10. The offset coupling according to claim 1, wherein one end of each of the first cranks is provided with a bearing to be respectively pivotally connected to the first pivoting portion and the fourth pivoting portion.

* * * * *